(12) United States Patent
Banerjee et al.

(10) Patent No.: US 8,329,247 B2
(45) Date of Patent: Dec. 11, 2012

(54) METHODS FOR PRODUCING OMNI-DIRECTIONAL MULTI-LAYER PHOTONIC STRUCTURES

(75) Inventors: Debasish Banerjee, Ann Arbor, MI (US); Benjamin Alan Grayson, Ann Arbor, MI (US); Minjuan Zhang, Ann Arbor, MI (US); Masahiko Ishii, Okazaki (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 967 days.

(21) Appl. No.: 12/389,256

(22) Filed: Feb. 19, 2009

(65) Prior Publication Data
US 2010/0209593 A1  Aug. 19, 2010

(51) Int. Cl.
B05D 5/06 (2006.01)
(52) U.S. Cl. .................. 427/8; 427/9; 427/10; 427/162
(58) Field of Classification Search .................. 427/8, 9, 427/10, 162
See application file for complete search history.

(56) References Cited

U.S. PATENT DOCUMENTS

| | | | |
|---|---|---|---|
| 3,247,392 A | 4/1966 | Thelen | |
| 3,769,515 A | 10/1973 | Clark, Jr. | |
| 3,885,408 A | 5/1975 | Clark, Jr. | |
| 3,910,681 A | 10/1975 | Elliott et al. | |
| 4,079,605 A | 3/1978 | Bartels | |
| 4,449,126 A | 5/1984 | Pekker | |
| 4,525,028 A | 6/1985 | Dorschner | |
| 4,556,599 A | 12/1985 | Sato et al. | |
| 4,643,518 A | 2/1987 | Taniguchi | |
| 4,673,914 A | 6/1987 | Le | |
| 4,714,308 A | 12/1987 | Sawamura et al. | |
| 4,868,559 A | 9/1989 | Pinnow | |
| 5,007,710 A | 4/1991 | Nakajima et al. | |
| 5,043,593 A | 8/1991 | Tsutsumi et al. | |
| 5,132,661 A | 7/1992 | Pinnow | |
| 5,138,468 A | 8/1992 | Barbanell | |
| 5,245,329 A | 9/1993 | Gokcebay | |
| 5,279,657 A | 1/1994 | Phillips et al. | |
| 5,283,431 A | 2/1994 | Rhine | |
| 5,323,416 A | 6/1994 | Bhat et al. | |
| 5,491,470 A | 2/1996 | Veligdan | |
| 5,543,665 A | 8/1996 | Demarco | |

(Continued)

FOREIGN PATENT DOCUMENTS

| | | |
|---|---|---|
| JP | 2000329933 | 11/2000 |
| JP | 2005144925 | 6/2005 |
| WO | WO02054030 | 7/2002 |
| WO | WO03062871 | 3/2003 |

OTHER PUBLICATIONS

Bendiganavale A.K., Malshe V.C., Recent Patents on Chemical Engineering, 2008, 1, 67-79.

(Continued)

*Primary Examiner* — Leo B Tentoni
(74) *Attorney, Agent, or Firm* — Dinsmore & Shohl, LLP

(57) ABSTRACT

A method for producing a multi-layer photonic structure having at least one group of alternating layers of high index material and low index material may include, determining a characteristic property function for the multi-layer photonic structure, determining a thickness multiplier for the at least one group of alternating layers based on a comparison of the characteristic property function to a target profile, adjusting the characteristic property function with the determined thickness multiplier, and comparing an adjusted characteristic property function to the target profile, wherein, when the adjusted characteristic property function does not approximate the target profile, at least one additional group of layers is added to the multi-layer photonic structure.

20 Claims, 7 Drawing Sheets

U.S. PATENT DOCUMENTS

| | | | |
|---|---|---|---|
| 5,561,420 | A | 10/1996 | Kleefeldt et al. |
| 5,571,624 | A | 11/1996 | Phillips et al. |
| 5,653,792 | A | 8/1997 | Phillips et al. |
| 5,691,844 | A | 11/1997 | Oguchi et al. |
| 5,850,309 | A | 12/1998 | Shirai et al. |
| 5,889,603 | A | 3/1999 | Roddy et al. |
| 6,049,419 | A | 4/2000 | Wheatley et al. |
| 6,055,079 | A | 4/2000 | Hagans et al. |
| 6,130,780 | A | 10/2000 | Joannopoulos et al. |
| 6,156,115 | A | 12/2000 | Pfaff et al. |
| 6,180,025 | B1 | 1/2001 | Schoenfeld et al. |
| 6,331,914 | B1 | 12/2001 | Wood et al. |
| 6,387,457 | B1 | 5/2002 | Jiang et al. |
| 6,399,228 | B1 | 6/2002 | Simpson |
| 6,433,931 | B1 | 8/2002 | Fink et al. |
| 6,565,770 | B1 | 5/2003 | Mayer et al. |
| 6,574,383 | B1 | 6/2003 | Erchak et al. |
| 6,618,149 | B1 | 9/2003 | Stirton |
| 6,624,945 | B2 | 9/2003 | Fan et al. |
| 6,667,095 | B2 | 12/2003 | Wheatley et al. |
| 6,873,393 | B2 | 3/2005 | Ma |
| 6,887,526 | B1 | 5/2005 | Arlt et al. |
| 6,894,838 | B2 | 5/2005 | Mizrahi et al. |
| 6,903,873 | B1 | 6/2005 | Joannopoulos et al. |
| 6,927,900 | B2 | 8/2005 | Liu et al. |
| 6,997,981 | B1 | 2/2006 | Coombs et al. |
| 7,098,257 | B2 | 8/2006 | Rink et al. |
| 7,123,416 | B1 | 10/2006 | Erdogan et al. |
| 7,141,297 | B2 | 11/2006 | Condo et al. |
| 7,184,133 | B2 | 2/2007 | Coombs et al. |
| 7,190,524 | B2 | 3/2007 | Grawert et al. |
| 7,215,473 | B2 | 5/2007 | Fleming |
| 7,267,386 | B2 | 9/2007 | Hesch |
| 7,367,691 | B2 | 5/2008 | Lin |
| 7,410,685 | B2 | 8/2008 | Rosenberger et al. |
| 7,446,142 | B2 | 11/2008 | Meisenburg et al. |
| 7,483,212 | B2 | 1/2009 | Cho et al. |
| 7,903,339 | B2 | 3/2011 | Banerjee et al. |
| 7,980,711 | B2 | 7/2011 | Takayanagi et al. |
| 2001/0022151 | A1 | 9/2001 | Sliwinski et al. |
| 2002/0129739 | A1 | 9/2002 | Yanagimoto et al. |
| 2003/0059549 | A1 | 3/2003 | Morrow et al. |
| 2004/0047055 | A1 | 3/2004 | Mizrahi et al. |
| 2004/0156984 | A1 | 8/2004 | Vitt et al. |
| 2004/0179267 | A1 | 9/2004 | Moon et al. |
| 2004/0246477 | A1 | 12/2004 | Moon et al. |
| 2004/0263983 | A1 | 12/2004 | Acree |
| 2004/0265477 | A1* | 12/2004 | Nabatova-Gabain et al. .. 427/10 |
| 2005/0126441 | A1 | 6/2005 | Skelhorn |
| 2005/0235714 | A1 | 10/2005 | Lindstrom |
| 2006/0030656 | A1 | 2/2006 | Tarng et al. |
| 2006/0081858 | A1 | 4/2006 | Lin et al. |
| 2006/0159922 | A1 | 7/2006 | O'Keefe |
| 2006/0222592 | A1 | 10/2006 | Burda |
| 2007/0221097 | A1 | 9/2007 | Tarng et al. |
| 2009/0046368 | A1 | 2/2009 | Banerjee et al. |
| 2009/0082659 | A1 | 3/2009 | Ham et al. |
| 2009/0153953 | A1 | 6/2009 | Banerjee et al. |
| 2009/0303044 | A1 | 12/2009 | Furuichi et al. |
| 2010/0208338 | A1 | 8/2010 | Banerjee et al. |
| 2010/0209593 | A1 | 8/2010 | Banerjee et al. |
| 2010/0213485 | A1* | 8/2010 | McKenzie et al. ............. 257/98 |

OTHER PUBLICATIONS

D.P. Young, Jr., W.P. Erickson, M.D. Strickland, R.E. Good, and K.J. Sernka, Comparison of Avian Responses to UV-Light-Reflective Paint on Wind Turbines, Subcontract Report, 2000.

Maier, E.J. To deal with the "invisible": On the biological significance of ultraviolet sensitivity in birds. Naturwissenschaften 80: 476-478, 1993.

Nixon J, Asia Pacific Coating Journal, 17(1), 20, 2004.

Y. Fink, J. N. Winn, S. Fan, C. Chen, J. Michel, J.D. Joannopoulos, E. L. Thomas, Science, 282, 27 (1998).

Lin, G. Ping Wang, S, Zhang, Journal of Modern Optics, 52, 8, 1155 (2005).

K. M. Chen, A.W. Sparks, H. Luan, D.R. Lim, K. Wada, and L. C. Kimerlinga, Appl. Phys. Lett., 75, 13 (1999).

R.M. Almeida, A.S. Rodrigues, Journal of Non-Crystalline Solids, 405 (2003).

M. Deopura, C. K. Ullal, B. Temelkuran, and Y. Fink, Optics Letters, 26, 15 (2001).

R. G. DeCorby, H. T. Nguyen, P. K. Dwivedi, T. J. Clement, Optics Express 13, 6228 (2005).

T. J. Clement, N. Ponnampalam, H. T. Nguyen, R.G. DeCorby, Optics Express, 14, 1789 (2006).

Bruyanta, G. Le'rondel, Troyes codex. J. Reece, M. Gal, Appl. Phys. Lett. 82, 19 (2003).

D.N. Chigrin, A.V. Lavrinenko, D.A. Yarotsky, S.V. Gaponenko, Appl. Phys. A. 68, 25 (2003).

Y. Park, Y. Roh, C. Cho, H. Jeon, Appl. Phys. Lett., (2003), 82, 17.

H-Y Lee, T. Yao, J Appl. Phys., 93, 2, 819 (2003).

Banerjee D. SAE world Congress 01-1049 (2008).

International Search Report for PCT/US2010/022378 mailed Mar. 30, 2010.

Hongqiang et al, "Disordered dielectric high reflectors with broadband from visible to infrared," Applied Physics Letters, American Institute of Physics, Melville, NY, US, vol. 74, No. 22, dated May 31, 2009.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

Office Action mailed Jul. 20, 2011 as it relates to U.S. Appl. No. 12/389,221.

Office Action mailed Dec. 27, 2011 as it relates to U.S. Appl. No. 12/389,221.

Office Action mailed Oct. 20, 2011 as it relates to U.S. Appl. No. 12/853,801.

"Laser 2000 Gmbttp://www.laser2000.de/fileadmin/Produkdaten/SK_WEB/Datenblaetter_SEM/SEMROCK-StopLine-Notchfilter.pdf, accessed Feb. 2, 2010".

U.S. Appl. No. 12/686,861, filed Jan. 13, 2010 entitled "Multilayer Photonic Structures.".

U.S. Appl. No. 12/853,801, filed Aug. 10, 2010 entitled "Methods for Identifying Articles of Manufacture".

Office Action mailed Sep. 22, 2011 as it relates to U.S. Appl. No. 12/853,718.

Office Action mailed Apr. 26, 2012 as it relates to U.S. Appl. No. 12/389,221.

Office Action mailed Feb. 22, 2012 as it relates to U.S. Appl. No. 12/902,763.

Notice of Allowance mailed Feb. 16, 2012 as it relates to U.S. Appl. No. 12/853,718.

Office Action mailed Mar. 28, 2012 as it relates to U.S. Appl. No. 12/853,801.

Notice of Allowance mailed May 29, 2012 as it relates to U.S. Appl. No. 12/853,801.

* cited by examiner

METHODS FOR PRODUCING OMNI-DIRECTIONAL MULTI-LAYER PHOTONIC STRUCTURES

TECHNICAL FIELD

Embodiments described herein generally relate to multi-layer photonic structures and, more specifically, to methods for designing multi-layer photonic structures to produce a multi-layer photonic structure having the desired reflectance and transmission properties.

BACKGROUND

Sunlight comprises a range of wavelengths in the electromagnetic spectrum including ultraviolet (UV), visible, and infrared (IR) light. The color of a pigment associated with a particular object is determined by the wavelengths of light reflected by the pigment and observed by the human eye. For example, sunlight or white light comprises a roughly equal mixture of wavelengths in the visible spectrum. When white light is incident on a pigment, some wavelengths of the white light are absorbed while others are reflected. The reflected wavelengths determine the color of the pigment. For many pigments, reflectivity may be strongly dependent on the angle of the light incident on the object. Accordingly, the pigment may reflect different wavelengths of light for different angles of incidence while absorbing others. As such, the pigment may not necessarily behave as an omni-directional reflector for all wavelengths of light at all angles of incidence. This results in the pigment having a color shift for different angles of incident light.

Similar effects may be found with UV and IR light. Specifically, for different angles of incidence, a pigment may reflect certain wavelengths of UV and/or IR light while absorbing others which may result in undesirable effects. For example, when UV light is absorbed by a polymeric material, the polymeric material may break down the chemical bonds of the polymer. This process is called photo-degradation and may cause cracking, chalking, color change and/or the loss of physical properties of the polymeric material. Similarly, near IR sunlight (780 nm-2100 nm) carries 53% of the total solar energy, which, when absorbed, causes heat to build up on the surface of the object which may result in undesirable thermal conditions. On certain objects, such as automobiles, buildings and other structures, this build-up of heat may reduce the efficiency and/or performance of certain systems such as, for example, HVAC systems.

Accordingly, photonic structures which reflect at least UV and IR light omni-directionally may be desirable and alternative methods for producing such photonic structures are needed.

SUMMARY

In one embodiment, a method for producing a multi-layer photonic structure having at least one group of alternating layers of high index material and low index material may include determining a characteristic property function for the multi-layer photonic structure and determining a thickness multiplier for the at least one group of alternating layers. The thickness multiplier may be determined by fitting the characteristic property function to a target profile. The characteristic property function may be adjusted based on the determined thickness multiplier. Thereafter, the adjusted characteristic property function may be compared to the target profile. When the adjusted characteristic property function does not approximate the target profile, at least one additional group of layers may be added to the multi-layer photonic structure.

In another embodiment, method for producing an omni-directionally reflective multi-layer photonic structure comprising at least one group of alternating layers of high index material and low index material may include determining reflectance functions for the multi-layer photonic structure for multiple angles of light incident on the multi-layer photonic structure and a value for a thickness multiplier for each group of alternating layers. The value of the thickness multiplier for each group may be determined by fitting the reflectance function for each angle of light to a target reflectance profile. Thereafter, the adjusted reflectance function may be compared to the target profile for each angle of light. When the adjusted reflectance functions do not approximate the target reflectance profile, at least one additional group of layers may be added to the multi-layer photonic structure.

In yet another embodiment, a method for producing an omni-directional UV-IR reflector comprising at least one group of alternating layers of high and low index material may include determining reflectance functions for multiple angles of light incident on the multi-layer photonic structure. A target reflectance profile having about 100% reflectance for wavelengths of light in the UV range of the electromagnetic spectrum, less than 100% reflectance for wavelengths of light in the visible range of the electromagnetic spectrum, and about 100% reflectance for wavelengths of light in the IR range of the electromagnetic spectrum may be selected. Thereafter, a value for the at least one thickness multiplier may be determined by fitting the reflectance function for each angle of light to the target reflectance profile. The reflectance function for each angle of light may be adjusted based on the determined thickness multipliers. Thereafter, the adjusted reflectance function for each angle of light may be compared to the target reflectance profile. When the adjusted reflectance functions do not approximate the target reflectance profile, at least one additional group of layers may be added to the multi-layer photonic structure.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 2:
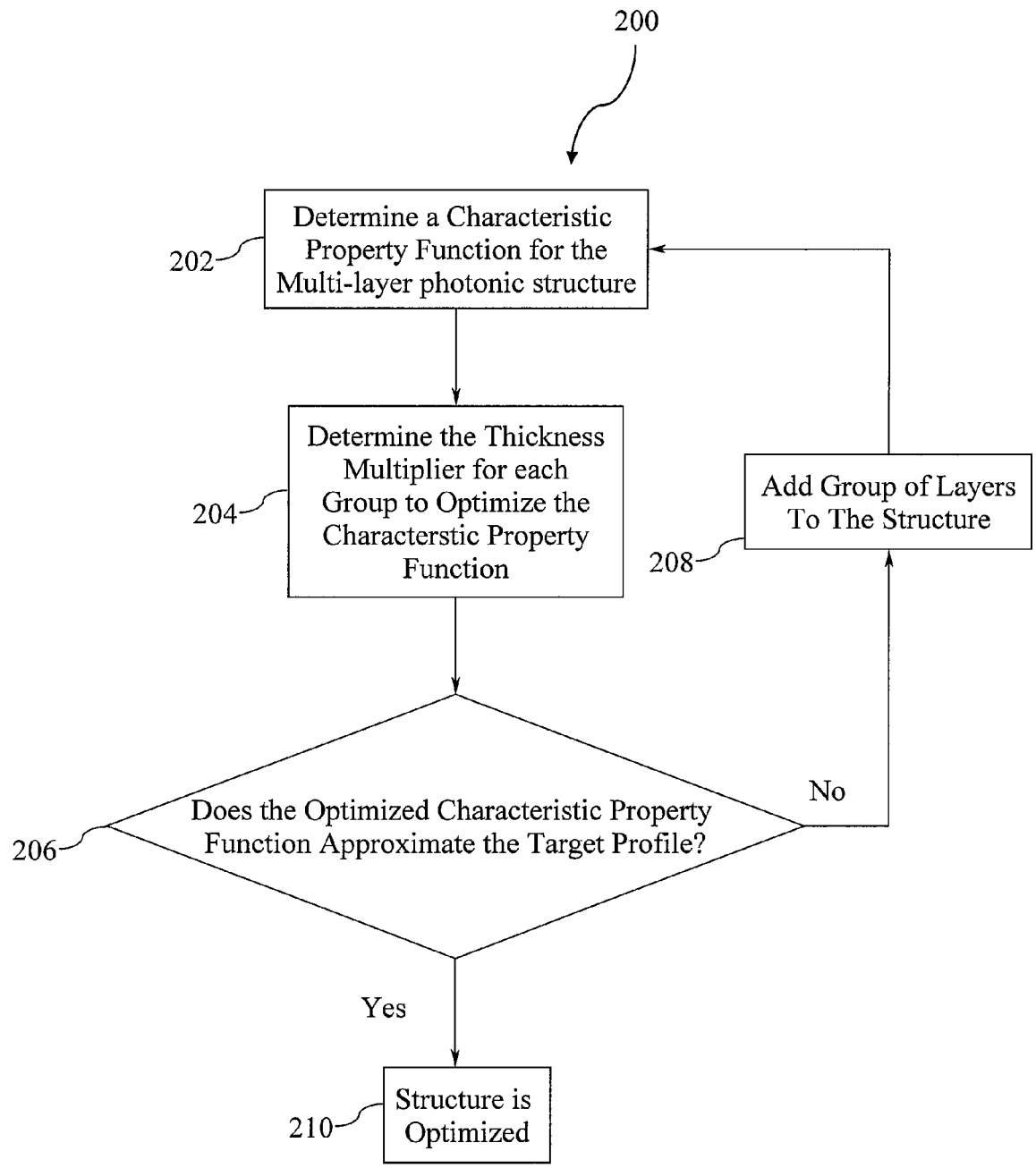
FIG. 2 depicts a flow diagram of a method for producing a multi-layer photonic structure according to one or more embodiments shown and described herein.

FIG. 2 generally depicts a flow diagram of one embodiment of a method for designing an omni-directional, multi-layer photonic structure to achieve a target characteristic property such as reflectance. The method may include selecting a target profile for the characteristic property as a function of the wavelength of light incident on the multi-layer photonic structure. A basic layer structure for the multi-layer photonic structure is also selected. The thickness of each layer of the basic layer structure may be expressed as a function of a wavelength of light incident on the structure, the index of refraction of the layer, and a thickness multiplier. A characteristic property function of the basic layer structure for a given angle of incident light may be determined as a function of the wavelength of incident light and the thickness multiplier. The thickness multiplier and, therefore, the thickness of each layer of the basic structure, may be determined by fitting the characteristic property function to the target profile. Methods for producing an omni-directional multi-layer photonic structure, and multi-layer photonic structures produced thereby, will be described in more detail herein.

In describing the method for designing omni-directional multi-layer photonic structures, reference will be made to electromagnetic radiation incident on the multi-layer photonic structure. It will be understood that the term "electromagnetic radiation" may be used interchangeably with the term "light" and that both terms refer to various wavelengths of the electromagnetic spectrum, particularly wavelengths in the ultraviolet (UV), infrared (IR), and visible portions of the electromagnetic spectrum.

Figure 1:
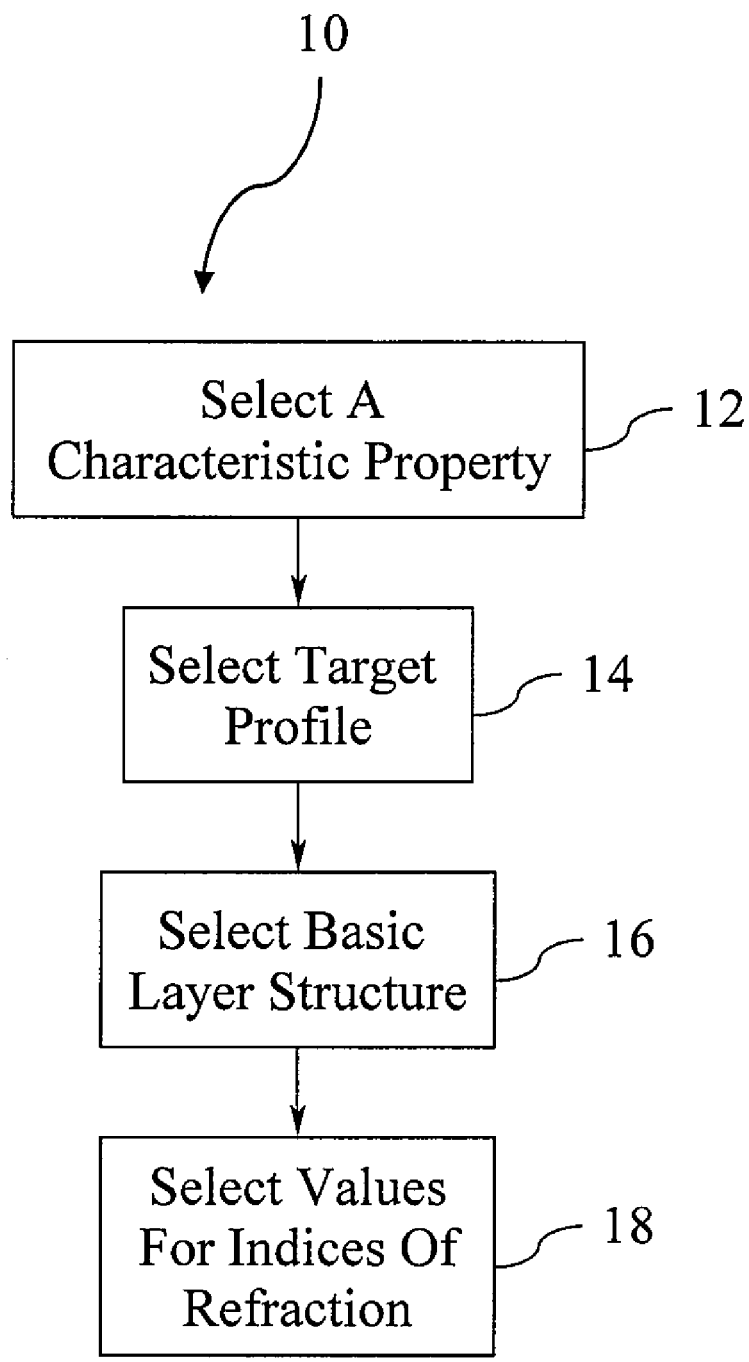
FIG. 1 depicts a flow diagram of preliminary steps for producing a multi-layer photonic structure according to one or more embodiments shown and described herein.

Referring now to FIG. 1, a flow diagram 10 of the preliminary steps for designing a multi-layer photonic structure having omni-directional properties is illustrated. While the steps listed in the flow diagram 10 are set out and described in a specific sequence, it should be understood that the order in which the preliminary steps are performed may be varied.

In one embodiment, the method of designing a multi-layer photonic structure having omni-directional properties may include a preliminary step 12 of selecting a characteristic property for the multi-layer structure. In the embodiments described herein, the characteristic property is the reflectance of the multi-layer photonic structure. Reflectance, as used herein, refers to the fraction or percentage of light incident on the multi-layer photonic structure which is reflected by the multi-layer photonic structure and may be plotted as a function of the wavelength of light incident on the structure.

While specific embodiments of the methods for designing multi-layer photonic structures described herein utilize reflectance as the characteristic property to be optimized, it should be understood that the methods described herein may, in the alternative, utilize the transmittance or absorptance as the characteristic property to be optimized. Transmittance, as used herein, refers to the fraction or percentage of light incident on the multi-layer photonic structure which is transmitted or passed through the multi-layer photonic structure and may be plotted as a function of the wavelength of light incident on the structure. Absorptance, as used herein, refers to the fraction or percentage of light incident on the multi-layer photonic structure which is neither reflected nor transmitted and may be determined from the reflectance and the transmittance.

Figure 5:
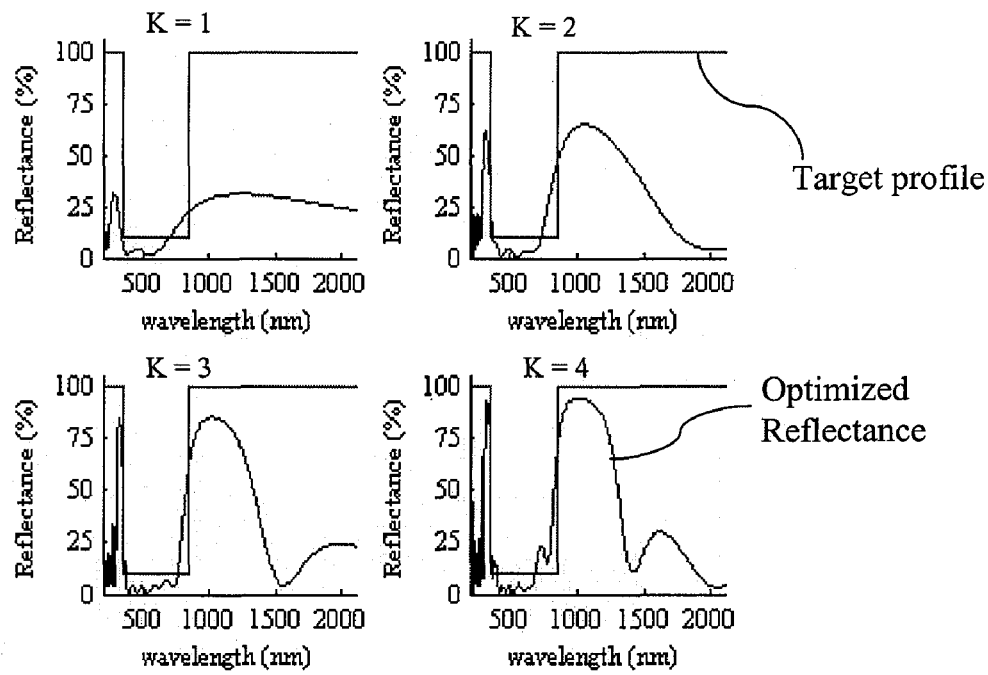
FIG. 5 graphically illustrates the reflectance as a function of wavelength for light having an angle of incidence of 0° on a multi-layer photonic structure having 1, 2, 3, and 4 multi-layer groups according, to one or more embodiments described herein.
Figure 6A:
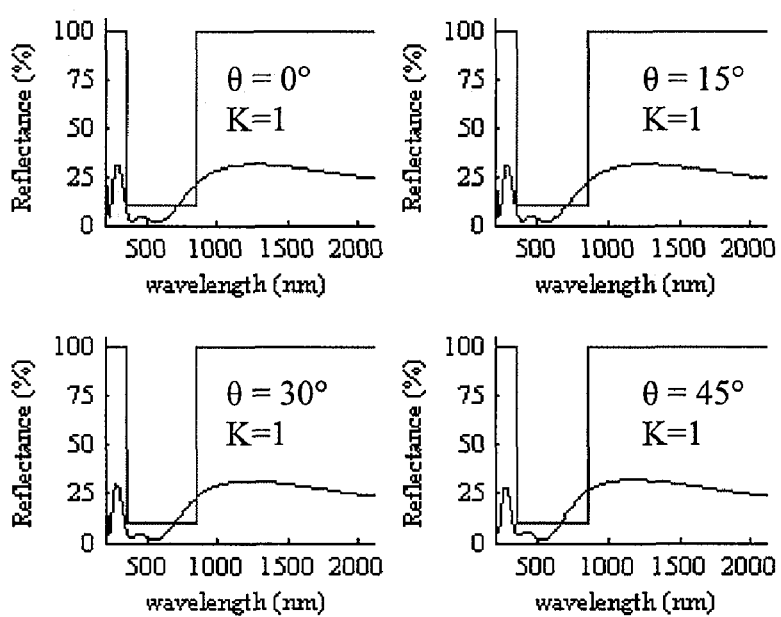
FIGS. 6A-6D graphically illustrate the reflectance as a function of wavelength for light having an angle of incidence of 0°, 15°, 30° and 45° for multi-layer photonic structure having 1, 2, 3 and 4 multi-layer groups.
Figure 6B:
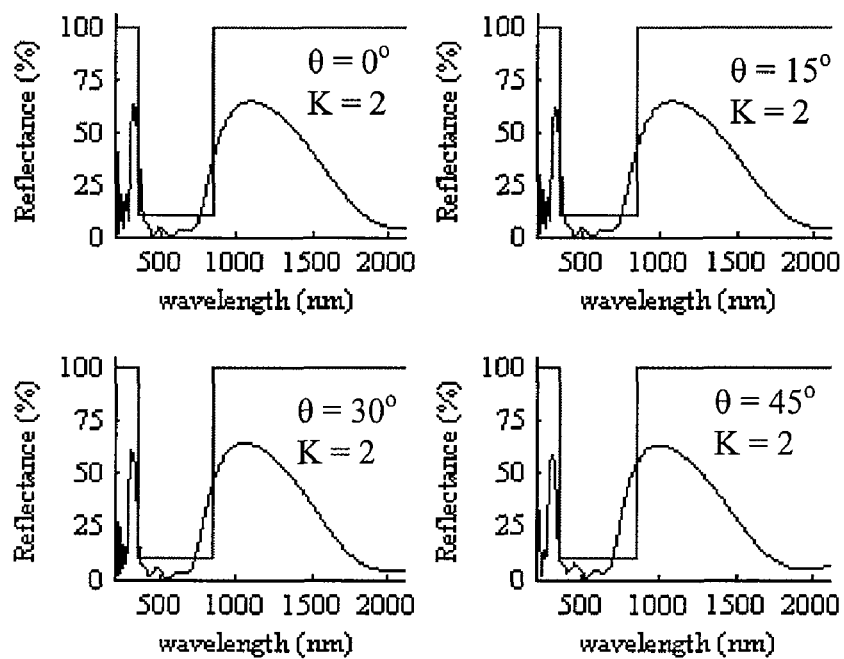
Figure 6C:
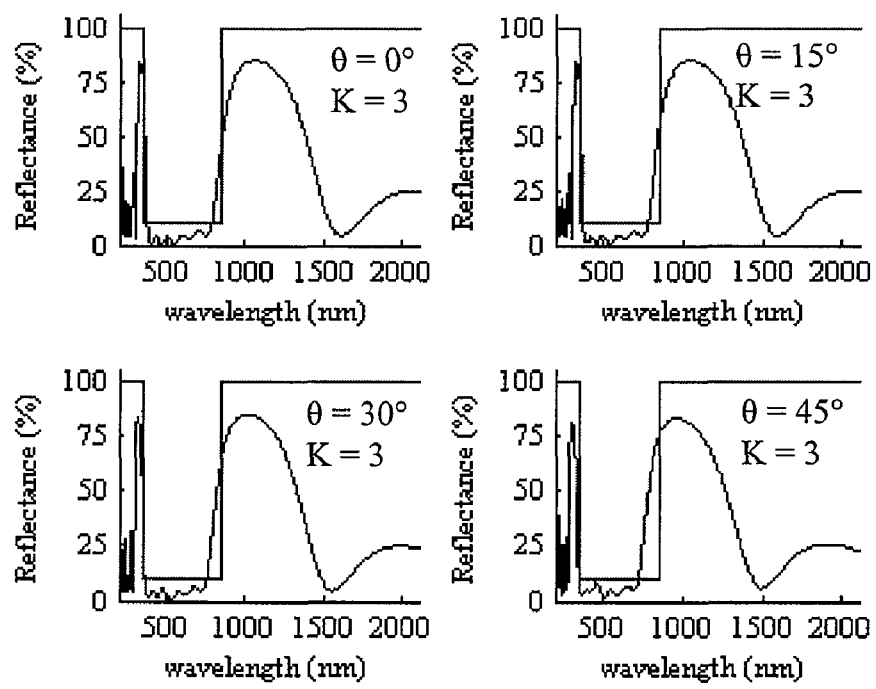
Figure 6D:
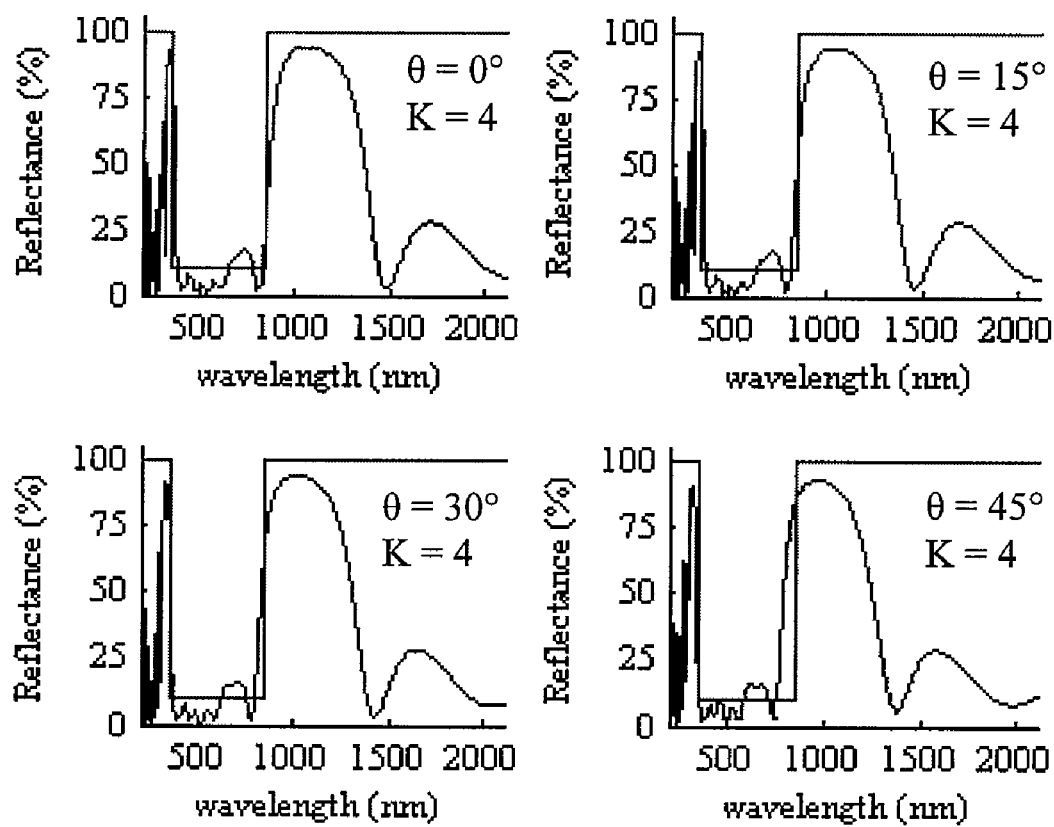

In another preliminary step 14, a target profile for the characteristic property is selected. In the embodiments described herein where the characteristic property is the reflectance of the multi-layer photonic structure, a target reflectance profile may be selected such that the optimized multi-layer photonic structure has certain reflectance characteristics. For example, in one embodiment, the target reflectance profile may be a square-well reflectance profile such that the optimized multi-layer photonic structure reflects UV and IR light while being transparent to visible light. More specifically, the square-well reflectance profile may have 100% reflectance for wavelengths from about 200 nm to about 350 nm (e.g., wavelengths of light in the UV portion of the electromagnetic spectrum), 10% reflectance for wavelengths from about 350 nm to about 850 nm (e.g., wavelengths in the visible portion of the electromagnetic spectrum), and 100% reflectance for wavelengths from about 850 nm to about 2100 nm (e.g., wavelengths in the IR portion of the electromagnetic spectrum), as shown in FIG. 5.

While the target profile described hereinabove is a target reflectance profile having a square-well shape, it should be understood that other target profiles having different shapes may be utilized. For example, the target profile may be a curve or any other suitable shape for achieving a desired reflectance in the optimized multi-layer photonic structure. Further, while the target profile described hereinabove is a target reflectance profile, it should be understood that the target profile may also be a target transmittance profile or a target absorption profile.

Another preliminary step 16 may comprise selecting a basic layer structure for the multi-layer photonic structure. The multi-layer photonic structures described herein generally comprise layers of material with a relatively high refractive index $n_H$ (e.g., high index material) and layers of material with a relatively low refractive index $n_L$ (e.g., low index material) alternately arranged.

Figure 3:
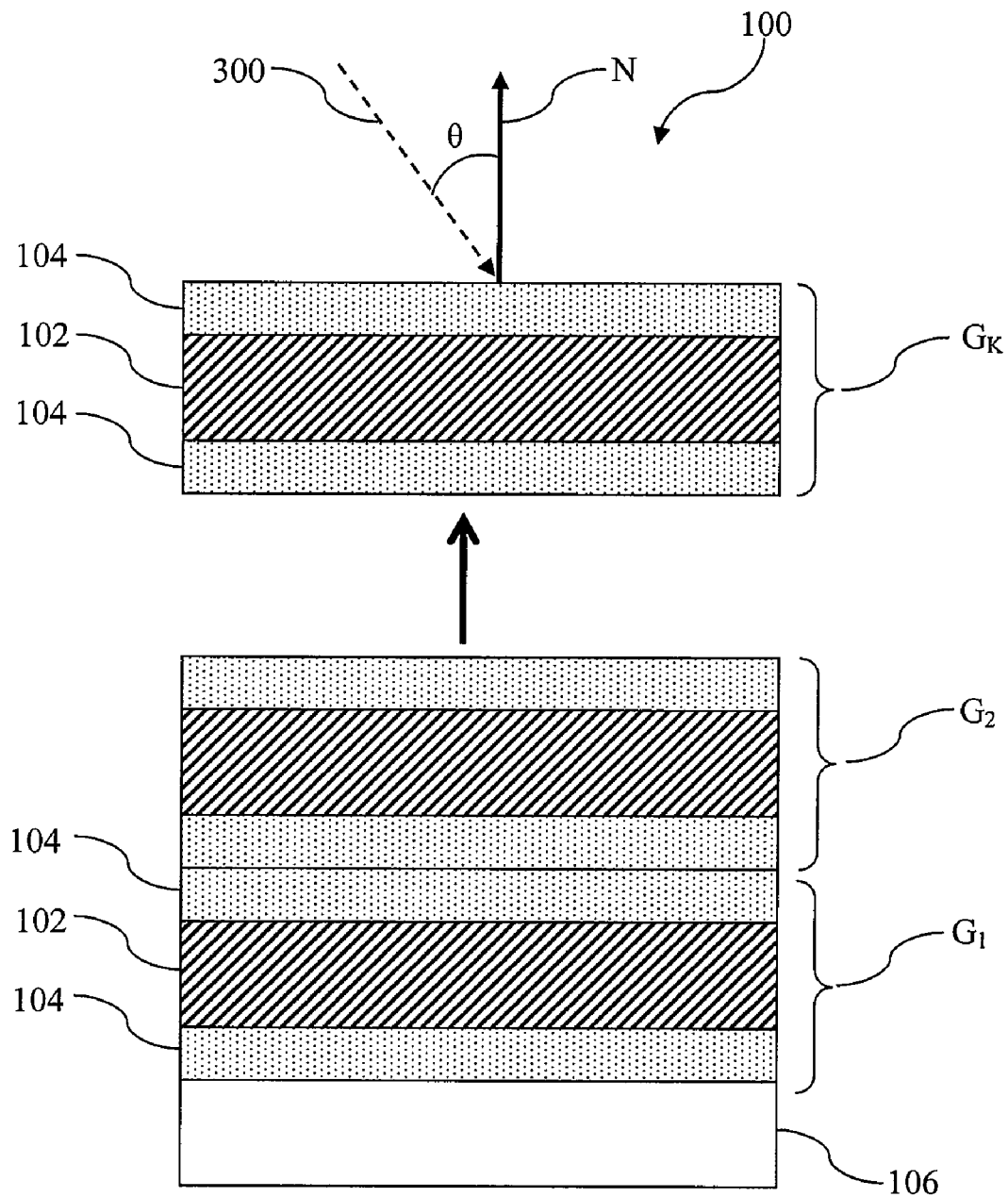
FIG. 3 depicts a multi-layer photonic structure for use in conjunction with the method for producing a multi-layer photonic structure according to one or more embodiments shown and described herein.

Referring to FIG. 3, in one embodiment, where the target profile is a target reflectance profile with a square-well shape, as described above, the basic layer structure of the multi-layer photonic structure 100 may comprise one or more groups of layers $G_K$. Each group of layers $G_K$ may comprise alternating layers of high and low index materials. For example, a group of layers $G_K$ may comprise a single layer of high index material 102 disposed between two layers of low index material 104. As will be described in more detail herein, the multi-layer photonic structure 100 may comprise a single group of layers (e.g., K=1) or, in the alternative, multiple groups of layers, in order to achieve the desired target profile. The multi-layer photonic structure may be deposited on a substrate 106 which may include glass, polymeric materials, ceramic materials, metallic materials, composite materials and/or various combinations thereof.

In the embodiment shown in FIG. 3, each group of layers $G_K$ may be described by the general form:

$$[0.5\, m_K L \;\; m_K H \;\; 0.5\, m_K L]$$

where L represents a layer of low index material having a thickness $D_L$, H represents a layer of high index material having a thickness $D_H$, and $m_K$ is a thickness multiplier applied to the group $G_K$. Accordingly, the multi-layer structure 100 may have the general form:

$$[(0.5\, m_K L \;\; m_K H \;\; 0.5\, m_K L)^K]$$

where K is an integer $\geq 1$ which represents the number of groups of layers $G_K$ in the designed multi-layer photonic structure 100.

In the embodiment of the multi-layer photonic structure shown in FIG. 3, the structure may be a non-quarter wave stack where the thickness $D_L$ of each layer of low index material 104 in a group of layers $G_K$ may be written as:

$$D_L = \frac{m_K \lambda_{ref}}{8n_L} \quad (1)$$

where $n_L$ is the index of refraction of the low index material, $\lambda_{ref}$ is a reference wavelength of light incidence on the coating and $m_K$ is a thickness multiplier for the group, as described above. Similarly, the thickness $D_H$ of each layer of high index material 104 in a group $G_K$ may be written as:

$$D_H = \frac{m_K \lambda_{ref}}{4n_H} \quad (2)$$

where $n_H$ is the index of refraction of the high index material, $\lambda_{ref}$ is a reference wavelength of light incidence on the coating and $m_K$ is a thickness multiplier for the group, as described above.

While FIG. 3 depicts one embodiment of the basic layer structure for a multi-layer photonic structure 100, it should be understood that other structures may be utilized. For example, the multi-layer photonic structure may have a different arrangement of layers and/or layer thicknesses. Further, it will be understood that the method described herein for producing multi-layer photonic structures may be utilized in conjunction with such other structures.

Referring again to FIG. 1, in another preliminary step 18, values for the index of refraction $n_H$ of the high index material and the index of refraction $n_L$ of the low index material may be selected. In one embodiment, the values for $n_L$ and $n_H$ are selected such that the values are the same as commonly available materials. For example, the value of $n_L$ may be selected to be 1.5 while the value for $n_H$ may be selected to be 2.5 such that the values of $n_L$ and $n_H$ approximate the indices of refraction for silica ($SiO_2$, index of refraction 1.46) and anatase ($TiO_2$, index of refraction 2.49), respectively. Accordingly, a multi-layer photonic structure design which utilizes 1.5 and 2.5 for $n_L$ and $n_H$, respectively, may be constructed from silica and anatase or other materials having the same or similar indices of refraction. It should be understood that other values for $n_L$ and $n_H$ may be selected which correspond to the indices of refraction of other materials. Table 1, shown below, contains a non-exclusive list of possible materials and their corresponding indices of refraction which may be utilized in the multi-layer photonic structures described herein.

TABLE 1

| Material | Index of Refraction (visible spectrum) | Material | Index of Refraction (visible spectrum) |
|---|---|---|---|
| Germanium (Ge) | 4.0-5.0 | Chromium (Cr) | 3.0 |
| Tellurium (Te) | 4.6 | Tin Sulfide (SnS) | 2.6 |
| Gallium Antimonite (GaSb) | 4.5-5.0 | Low Porous Si | 2.56 |
| Indium Arsenide (InAs) | 4.0 | Chalcogenide glass | 2.6 |
| Silicon (Si) | 3.7 | Cerium Oxide ($CeO_2$) | 2.53 |
| Indium Phosphate (InP) | 3.5 | Tungsten (W) | 2.5 |
| Gallium Arsenate (GaAs) | 3.53 | Gallium Nitride (GaN) | 2.5 |
| Gallium Phosphate (GaP) | 3.31 | Manganese (Mn) | 2.5 |
| Vanadium (V) | 3 | Niobium Oxie ($Nb_2O_3$) | 2.4 |
| Arsenic Selenide ($As_2Se_3$) | 2.8 | Zinc Telluride (ZnTe) | 3.0 |
| $CuAlSe_2$ | 2.75 | Chalcogenide glass + Ag | 3.0 |
| Zinc Selenide (ZnSe) | 2.5-2.6 | Zinc Sulfate (ZnSe) | 2.5-3.0 |
| Titanium Dioxide ($TiO_2$) - solgel | 2.36 | Titanium Dioxide ($TiO_2$) - vacuum deposited | 2.43 |
| Alumina Oxide (Al2O3) | 1.75 | Sodium Aluminum Fluoride (Na3AlF6) | 1.6 |
| Yttrium Oxide (Y2O3) | 1.75 | Polyether Sulfone (PES) | 1.55 |
| Polystyrene | 1.6 | High Porous Si | 1.5 |
| Magnesium Fluoride (MgF2) | 1.37 | Indium Tin Oxide nanorods (ITO) | 1.46 |
| Lead Fluoride (PbF2) | 1.6 | Lithium Fluoride (LiF4) | 1.45 |
| Potassium Fluoride (KF) | 1.5 | Calcium Fluoride | 1.43 |
| Polyethylene (PE) | 1.5 | Strontium Fluoride (SrF2) | 1.43 |
| Barium Fluoride (BaF2) | 1.5 | Lithium Fluoride (LiF) | 1.39 |
| Silica (SiO2) | 1.5 | PKFE | 1.6 |
| PMMA | 1.5 | Sodium Fluoride (NaF) | 1.3 |
| Aluminum Arsenate (AlAs) | 1.56 | Nano-porous Silica (SiO2) | 1.23 |
| Solgel Silica (SiO2) | 1.47 | Sputtered Silica (SiO2) | 1.47 |
| N,N' bis(1naphthyl)-4,4'Diamine (NPB) | 1.7 | Vacuum Deposited Silica (SiO2) | 1.46 |
| Polyamide-imide (PEI) | 1.6 | Hafnium Oxide | 1.9-2.0 |

In addition to values for $n_L$ and $n_H$, values for the indices of refraction for the substrate $n_{substrate}$ on which the multi-layer photonic structure is deposited and the incidence material $n_0$ (e.g., the index of refraction of the medium directly adjacent to the upper-most or final layer of the structure) may also be assigned. For example, when the optimized multi-layer photonic structure will be deposited on glass, $n_{substrate}$ is about 1.52. When the medium directly adjacent the upper-most layer of the structure is air, $n_0$ is about 1.0. It should be understood that the values for $n_{substrate}$ and $n_0$ may vary according to the specific substrates and environments in which the multi-layer photonic structure is used.

Turning now to FIG. 2, a flow diagram is depicted of the method 200 for producing a multi-layer photonic structure. For purposes of illustration, the various steps of the method 200 for producing a multi-layer photonic structure will be described with specific reference to a multi-layer photonic structure which reflects UV and IR light but is transparent to (or transmits) visible light, as described above. This multi-layer photonic structure may be referred to herein as a "UV-IR reflector." Accordingly, in the preliminary steps described above, the characteristic target property is the reflectance of the multi-layer photonic structure, the target profile is a target reflectance profile having a square-well shape, and the basic layer structure of the multi-layer photonic structure is a three layer structure having the form [0.5 $m_K$L $m_K$H 0.5 $m_K$L], as described above. However, it should be understood that the method described herein may be used in conjunction with various other target profiles, basic layer structures and characteristic properties.

In a first step 202, characteristic property function is determined for the multi-layer photonic structure. Characteristic property function, as used herein, is defined as a function describing a particular characteristic property of the multi-layer photonic structure such as, for example, the reflectance or transmittance. In the example described herein, the characteristic property is the reflectance of the multi-layer photonic structure. The characteristic property function may be determined as a function of the thickness multiplier $m_K$ of each group of layers $G_K$ in the structure over a range of wavelengths of interest. The characteristic property function may be initially determined for a single group of layers $G_K$ having the basic layer structure and, thereafter, additional layers may be added to the structure to further optimize the characteristic property.

In one embodiment, when the characteristic property is the reflectance, the characteristic property function is the reflectance of the multi-layer photonic structure and may be determined using a transfer matrix method where the reflectance of the multi-layer structure is dependent on: the angle of light incident on the coating (e.g., the angle of incidence), the degree of polarization, the wavelength(s) of interest, the thicknesses of each layer of the multi-layer photonic structure and the indices of refraction of the high and low index materials, the transmission medium, and the incidence medium. The transfer matrix method will now be described in more detail.

The "matrix method" refers to a methodology for calculating the reflectance and transmittance of a photonic structure using matrix algebra as described in the Ph.D. thesis entitled "Fundamental Studies of Polyelectrolyte Multilayer Films: Optical Mechanical and Lithographic Property Control" by Adam John Nolte (Massachusetts Institute of Technology, 2007). However, it should be understood that other methods for calculating the reflectance and the transmittance of a photonic structure may be used. The propagation of light in a multi-layer photonic structure may be understood by examining the defraction of light in each layer of the structure.

The symbol "j" used herein refers to a single layer of a photonic structure having an index of refraction and thickness of $n_j$ and $d_j$ respectively. For a photonic structure comprising J distinguishable layers, there are J+1 interfaces in the structure. For purposes of describing the transfer matrix method, the incidence medium (e.g., the medium adjacent to the upper-most layer of the structure) is labeled with a subscript of "0", and the substrate medium on which the photonic structure is deposited with a subscript of "J+1". For example, the incidence medium has an index of refraction $n_0$ while the substrate layer has an index of refraction $n_{j+1}$. Inside a layer j, electromagnetic radiation undergoes a shift in phase of $i \cdot \delta_j$ such that:

$$\delta_j = \frac{2\pi \cdot n_j \cdot d_j \cdot \cos\theta_j}{\lambda} \quad (3)$$

where $\lambda$ is the wavelength of the incident light, $\theta_j$ is the angle of refraction in layer j, which by Snell's Law is given by:

$$n_0 \sin\theta_0 = n_j \sin\theta_j \quad (4)$$

where, by the notation introduced above, $n_0$ and $\theta_0$ are the refractive index and angle of incidence in the incident medium. Referring to FIG. 3, the angle of incidence, as used herein, is the angle between a ray of incident light 300 and a normal N to the uppermost surface of the multi-layer photonic structure. It will be understood that Equation (4) may be solved for $\theta_j$ such that $\theta_j$ is a function of the angle of incidence $\theta_0$ of light on the layer.

The light incident on the layer comprises an electric field component and a magnetic field component. Accordingly, the magnitudes of the total electric (E) and magnetic (H) field for the transverse electric polarization (TE) and the transverse magnetic polarization (TM) at each interface in the structure may be written as:

$$E_{j,TE} = E_j^+ + E_j^- \quad (5)$$

$$H_{j,TE} = \eta_{j,TE} \cdot (E_j^+ - E_j^-) \quad (6)$$

$$E_{j,TM} = (E_j^+ - E_j^-) \cdot \cos(\theta_j) \quad (7)$$

$$H_{j,TM} = \eta_{j,TM} \cdot (E_j^+ + E_j^-) \cdot \cos(\theta_j) \quad (8)$$

where the particular form of $\eta_j$, the optical admittance, depends upon the polarization:

$$\eta_{j,TE} = \sqrt{\frac{\varepsilon_0}{\mu_0}} \cdot n_j \cdot \cos\theta_j \quad \text{(for } TE \text{ polarized radiation)} \quad (9)$$

$$\eta_{j,TM} = \sqrt{\frac{\varepsilon_0}{\mu_0}} \cdot n_j \bigg/ \cos\theta_j \quad \text{(for } TM \text{ polarized radiation)}. \quad (10)$$

$\varepsilon_0$ and $\mu_0$ are the permittivity and permeability of a vacuum, respectively, where $$\mu_0 = 4\pi \cdot 10^{-7} \frac{H}{m}$$

and $$\varepsilon_0 = \frac{1}{c^2 \cdot \mu_0} \approx 8.85 \cdot 10^{-12} \frac{F}{m}$$

where c is the speed of light in a vacuum.

Equations (3)-(10) may be rewritten in a matrix that relates the electric and magnetic fields at interfaces j and j+1 in terms of the properties of layer j:

$$\begin{bmatrix} E_j \\ H_j \end{bmatrix} = \begin{bmatrix} \cos\delta_j & \dfrac{i \cdot \sin\delta_j}{\eta_j} \\ i \cdot n_j \cdot \sin\delta_j & \cos\delta_j \end{bmatrix} \begin{bmatrix} E_{j+1} \\ H_{j+1} \end{bmatrix} = M_j \begin{bmatrix} E_{j+1} \\ H_{j+1} \end{bmatrix} \quad (11)$$

where $M_j$ is known as the characteristic matrix of a particular layer j. A total transfer matrix ($M_T$), also called a characteristic matrix, for the entire multi-layer photonic structure, may be obtained by multiplying the characteristic matrices for each individual layer in the multilayer photonic structure such that:

$$M_T = M_1 \cdot M_2 \ldots M_J = \prod_{j=1}^{J} M_j = \begin{bmatrix} m_{11} & m_{12} \\ m_{21} & m_{22} \end{bmatrix} \text{ and,} \quad (12)$$

$$\begin{bmatrix} E_0 \\ H_0 \end{bmatrix} = M_T \begin{bmatrix} E_{J+1} \\ H_{J+1} \end{bmatrix} \quad (13)$$

The amplitude reflection (r) and transmission (t) coefficients can be determined from $M_T$ as follows:

$$r_{TE} = \frac{E_0^-}{E_0^+} = \frac{\eta_{0\cdot TE} m_{11} + \eta_{0\cdot TE}\eta_{J+1\cdot TE} m_{12} - m_{21} - \eta_{J+1\cdot TE} m_{22}}{\eta_{0\cdot TE} m_{11} + \eta_{0\cdot TE}\eta_{J+1\cdot TE} m_{12} + m_{21} + \eta_{J+1\cdot TE} m_{22}} \quad (14)$$

$$t_{TE} = \frac{E_{J+1}^+}{E_0^+} = \frac{2\eta_{0\cdot TE}}{\eta_{0\cdot TE} m_{11} + \eta_{0\cdot TE}\eta_{J+1\cdot TE} m_{12} + m_{21} + \eta_{j+1\cdot TE} m_{22}} \quad (15)$$

$$r_{TM} = \frac{\eta_{0\cdot TM} m_{11} + \eta_{0\cdot TM}\eta_{J+1\cdot TM} m_{12} - m_{21} - \eta_{J+1\cdot TM} m_{22}}{\eta_{0\cdot TM} m_{11} + \eta_{0\cdot TM}\eta_{J+1\cdot TM} m_{12} + m_{21} + \eta_{J+1\cdot TM} m_{22}} \quad (16)$$

$$t_{TM} = \frac{2\eta_{0\cdot TM}}{\eta_{0\cdot TM} m_{11} + \eta_{0\cdot TM}\eta_{J+TM} m_{12} + m_{21} + \eta_{J+1\cdot TM} m_{22}} \cdot \frac{\cos(\theta_0)}{\cos(\theta_s)} \quad (17)$$

from which the reflectance (R) and transmittance (T), which are the actual fractions of light reflected and transmitted by the multi-layer photonic structure, respectively may be calculated. Specifically:

$$R = r \cdot r^* \quad (18)$$

$$T = t \cdot t^* \cdot \frac{\Re(n_s) \cdot \cos[\Re(\theta_s)]}{\Re(n_0) \cdot \cos[\Re(\theta_0)]}. \quad (19)$$

$$A = 1 - R - T \quad (20)$$

The variable "A" refers to the absorptance of the multi-layer photonic structure, which, as described above, is the fraction of the incident power that is absorbed by the structure and not reflected or transmitted. It should be understood that equations (3)-(20) may be implemented with a computer comprising software programmed to receive various inputs from a user related to the properties of a particular multi-layer photonic structure and determine function(s) for the reflectance R, the transmittance T and/or the absorptance A. Such software may be referred to as a photonics calculator.

As noted above, the transfer matrix method may be used to determine both the reflectance and the transmittance of the multi-layer photonic structure. Accordingly, while specific examples used herein describe determining the reflectance for a specific multi-layer photonic structure (e.g., the UV-IR reflector) using the transfer matrix method, it should be understood that the transfer matrix method may also be used to determine the transmittance of the structure and that the method described herein may also be utilized to optimize the transmittance.

By way of example, for a UV-IR reflector as described above, the thickness $d_j$ of each layer of the multi-layer photonic structure is defined by Equations (1) and (2) where the reference wavelength $\lambda_{ref}$ is 550 nm and $n_L$ and $n_H$ are 1.5 and 2.5, respectively. Accordingly, $\delta_j$ in Equation (3) may be written as a function of the thickness multiplier $m_K$ for each group $G_K$ of layers. Similarly, the index of refraction $n_j$ of each layer in the multi-layer photonic structure may be either 1.5 or 2.5 depending on whether the layer comprises high index material or low index material. The incidence medium may be air such that $n_0$ is 1 and the substrate medium is glass such that $n_{j+1}$ is 1.52. For this example, the incident light is natural, white light having equal contributions of TE and TM modes such that the degree of polarization is 0.5. The light incident on the coating may have a wavelength $\lambda$ from about 200 nm to about 2100 nm. The angle of incidence $\theta_0$ of the light is initially set to 0°. Based on these exemplary conditions, the reflectance R of the multi-layer photonic structure is dependent on the wavelength $\lambda$ of light incident on the multi-layer photonic structure and the thickness multiplier $m_K$ for each group of layers $G_K$ in the structure. An equation or system of equations for determining the reflectance and/or transmittance of the multi-layer photonic structure may be determined using the transfer matrix method, described above, in conjunction with a photonics calculator.

In a next step 204, the thickness multiplier $m_K$ for each group of layers $G_K$ is optimized such that the multi-layer photonic structure has a specific property. For example, the UV-IR reflector described herein may be optimized such that the UV-IR reflector reflects a certain percentage of light at a specific wavelength while reflecting a different amount of light at another wavelength. In order to optimize the thickness multiplier $m_K$, the characteristic property function may be compared to a target profile. In the example of the UV-IR reflector described herein, the characteristic property function is the reflectance R and the target profile is a target reflectance profile. As described above, to produce a UV-IR reflector, the target reflectance profile may have a square-well shape such that the reflectance of the corresponding structure is 100% for UV and IR wavelengths while the reflectance in the visible spectrum is less than 100%.

The value of the thickness multiplier $m_K$ may be determined by curve fitting the equation for the reflectance R, as determined through the transfer matrix method, to the target reflectance profile. Specifically, the reflectance R may be fit to the target reflectance profile by adjusting the thickness of the layers in each group of layers $G_K$ in the multi-layered photonic structure. This may be accomplished by adjusting the value of the thickness multiplier $m_K$ for each group of layers $G_K$. Accordingly, the optimization or curve fitting process yields values for the thickness multiplier $m_K$ such that the characteristic property function, in this case the reflectance R, approximates the target profile.

In one embodiment, values for $m_K$ may be determined by fitting the characteristic property function to the target profile using a non-linear curve fitting algorithm. In one embodiment, the non-linear curve fitting algorithm may solve a function through the minimization of the sum of the squared difference of a given function containing a vector of variables (e.g., the reflectance R) and a set of target coordinates (e.g., the target reflectance profile). For example, the minimization of the sum of squares difference may have the form:

$$\min \Sigma (F(x,y) - F(x, y_{Target}))^2$$

where $F(x,y)$ is the reflectance R and $F(x, y_{Target})$ is the target reflectance profile. The non-linear curve fitting algorithm described herein may be implemented with a computer system comprising software programmed to perform the non-linear curve fitting algorithm. In one embodiment, the curve fitting algorithm may be a part of the same software package as the photonics calculator described above. Accordingly, it will be understood that the software package may be operable to: receive inputs from a user related to the various parameters of a multi-layer photonic structure; receive a target profile input by a user; determine a characteristic property function for the multi-layer photonic structure based on the received inputs; and fit the characteristic property function to the received target profile thereby determining a thickness multiplier for a group of layers of the multilayer photonic structure. Alternatively, a suitable curve fitting algorithm which may be employed for determining values for $m_K$ may be the LSQCURVEFIT function of the Optimization Toolbox™ of the software package Matlab®. The equation for the reflectance R and the target reflectance profile may be imported into the software and solved for values of $m_K$ over a range of wavelengths from about 200 nm to about 2100 nm such that the reflectance R approximates the target reflectance profile. For example, Table 2, shown below, is indicative of values of thickness multipliers $m_K$ for K=1, 2, 3, and 4 which, in turn, corresponds to multi-layer photonic structures having 1, 2, 3 and 4 groups of layers. The values of $m_K$ in Table 2 were calculated utilizing the minimization of the sum of the squared difference algorithm for light having an angle of incidence $\theta_0$ of 0°.

TABLE 2

| K | $m_1$ | $m_2$ | $m_3$ | $m_4$ |
|---|---|---|---|---|
| 1 | 1.6749 | — | — | — |
| 2 | 1.7472 | 1.8290 | — | — |
| 3 | 1.7646 | 1.8291 | 1.7600 | — |
| 4 | 1.7638 | 1.9536 | 1.7475 | 1.7167 |

While the aforementioned curve fitting technique references the use of the sum of the squared difference algorithm, its should be understood that various other non-linear curve fitting techniques may be used in order to fit the reflectance R to the target reflectance profile and thereby determine the thickness multipliers $m_K$ for each group of layer $G_K$ in the multi-layer photonic structure.

Figure 4:
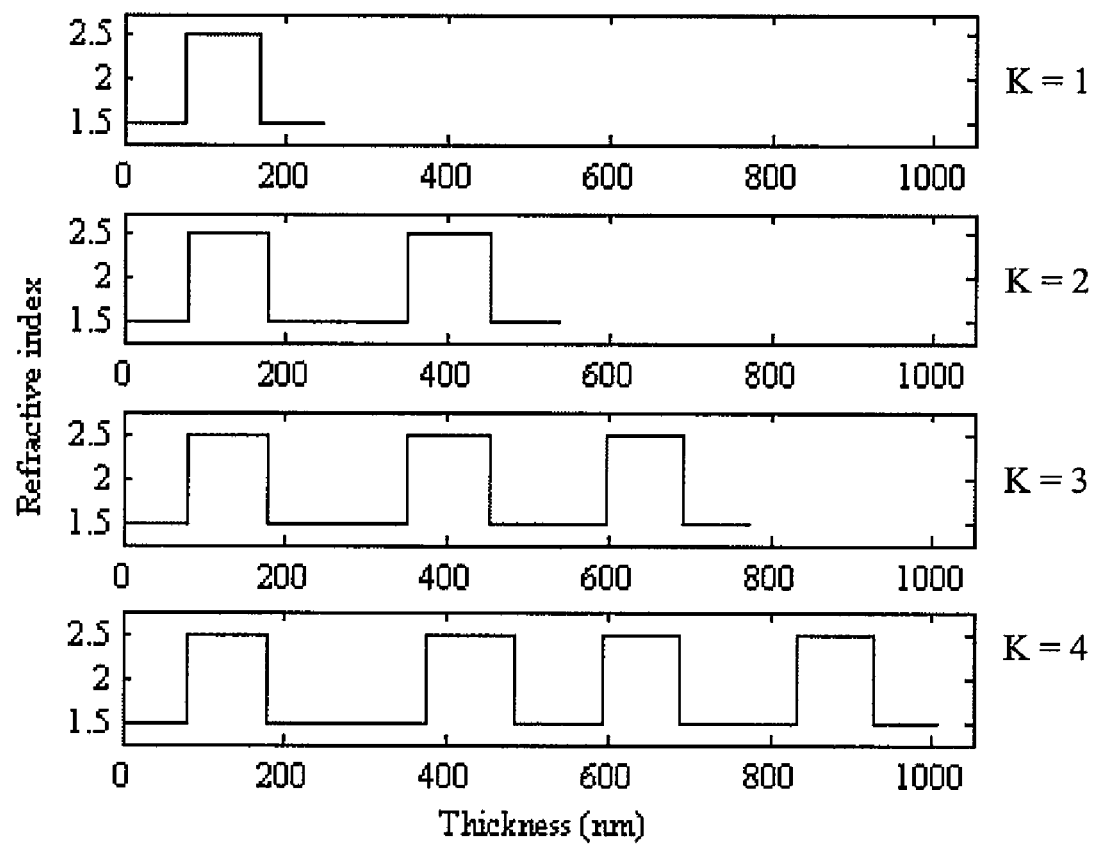
FIG. 4 graphically illustrates the thickness of each layer of a multi-layer photonic structure comprising 1, 2, 3 and 4 multi-layer groups, wherein each group comprises alternating layers of low index and high index materials, according to one or more embodiments shown and described herein.

Referring now to FIG. 4, a series of plots depicting the layer thickness ($D_L$, $D_H$) vs. the index of refraction of the layer are shown for the UV-IR reflector having multi-layer structures with 1, 2, 3 and 4 groups of layers $G_K$ (e.g., K=1, 2, 3, 4). The thickness of each layer of the UV-IR reflector was calculated utilizing Equations (1) and (2) and the values for $m_K$ from Table 2.

Referring again to FIG. 2, in step 206, the characteristic property function may be adjusted or optimized by incorporating the thickness multiplier into the previously determined characteristic property function. For example, the thickness multiplier may be incorporated into Equation (3) above, such as when the values of $D_L$ and $D_H$ are a function of the thickness multiplier. The adjusted or optimized characteristic property function is then compared to the target profile to determine if the optimized characteristic property function approximates the target profile. For example, for the UV-IR reflector, the optimized reflectance (e.g., the reflectance incorporating the thickness multipliers $m_K$ determined in step 204) may be plotted as a function of wavelength on the same axes as the square-well target reflectance profile to determine if the optimized reflectance approximates the target reflectance profile. For example, the UV-IR reflector example described herein, the reflectance approximates the target reflectance profile when the reflectance in the visible range is less than about 30% and the reflectance in the UV and near IR range is greater than about 90% of the target reflectance. It will be understood that the degree of approximation may vary depending on the desired properties of the resulting omni-directional multi-layer photonic structure.

Referring now to FIG. 5 by way of example, after values for $m_K$ have been determined for each group of layers $G_K$ in the multi-layer photonic structure, the reflectance of the structure may be plotted as a function of the wavelength of light incident on the multi-layer photonic structure. FIG. 5 shows the target reflectance profile, in this case the square-well reflectance profile described above, plotted on the same axes as the optimized reflectance. As shown in FIG. 5, when the multi-layer photonic structure comprises a single group of layers (e.g., K=1), the optimized reflectance does not closely approximate the target reflectance profile. However, as the number of groups of layers in the multi-layer structure is increased, (e.g., K=2, 3, 4), the optimized reflectance more closely approximates the target reflectance profile.

Referring again to FIG. 2, if the degree of approximation between the reflectance and the target reflectance profile is determined to be insufficient in step 206, the method 200 proceeds to step 208. In step 208, one or more additional groups of layers $G_K$ may be added to the multi-layer photonic structure. As noted above and graphically illustrated in FIG. 5, the addition of groups of layers $G_K$ to the multi-layer photonic structure may further optimize the multi-layer photonic structure such that the optimized reflectance more closely approximates the target reflectance profile. For the specific example of the UV-IR reflector, it has been determined that four groups of layers (e.g., K=4) sufficiently approximates the target reflectance profile.

After additional groups of layers $G_K$ are added to the multi-layer photonic structure, steps 202 and 204 are repeated for the entire multi-layer photonic structure. For example, if the multi-layer photonic structure initially comprised one group of layer (e.g., K=1) and a second group of layers was added to the structure in step 208 such that K=2, steps 202 and 204 are repeated such that the thickness multipliers $m_1$ and $m_2$ for groups $G_1$ and $G_2$, respectively, are determined. It should be noted that the addition of groups of layers to existing groups of layers requires that any previously determined thickness multipliers $m_K$ be re-determined in order to optimize the characteristic property function for the multi-layer photonic structure. For example, Table 2 shows that each additional group of layers added to the structure causes a change in the thickness multiplier for each previous group of layers.

The method 200 loops from step 206 to step 202 and additional groups of layers are added to the multi-layer photonic structure until the optimized characteristic property of the multi-layer photonic structure approximates the target reflective profile. As noted above, the UV-IR reflector is optimized when the structure comprises four groups of layers. Once the target profile is approximated, the optimization algorithm is complete (e.g., structure is optimized at 210).

As noted hereinabove, the multi-layer photonic structure is initially optimized for light having an angle of incidence of 0°. However, in order to tune the multi-layer photonic structure such that the characteristic property is optimized for omni-directional properties, such as omni-directional reflectance, the method 200 may be repeated for various other angles of incident light. Omni-directional reflectance, as used herein, refers to light being completely reflected irrespective of the angle of incidence. FIGS. 6A-6D shown below, show the optimized reflectance as a function of wavelength for various values of K (e.g., K=1, 2, 3, and 4) and various angles of incidence (e.g., $\theta_0$=0°, 15°, 30° and 45°). While the data depicted in FIGS. 6A-6D is optimized for angles of incidence from 0° to 45°, it should be understood that the multi-layer photonic structures described herein may be further optimized for other angles of incidence from about 0° up to less than about 90°.

Referring now to FIGS. 6A-6D, the modeled reflectance for the UV-IR reflector described herein is shown for various angles of incidence. As shown in FIGS. 6A-6D, increasing the angle of light incident on the coating only minimally effects the optimized reflectance. Specifically, as the angle of incidence is increased, there is a slight shift in the reflectance at higher wavelengths in the direction of lower wavelengths. However, it should be noted that this shift does not result in interference with the visible spectra. Accordingly, FIGS. 6A-6D indicate that the method described herein may be used to effectively "tune" a multi-layer photonic structure to achieve omni-directional characteristic properties, specifically omni-directional reflectivity.

After performing the method 200 for various angles of incident light, and thereby determining the thickness multipliers $m_K$ for each group of layers $G_K$ at each angle of incidence, the thickness multipliers may be averaged together. Table 3, shown below, contains the average value for the thickness multipliers $m_{KAVG}$ for the UV-IR reflector described herein such that the UV-IR reflector is tuned for omni-directional reflectivity.

TABLE 3

| K | $m_{1AVG}$ | $m_{2AVG}$ | $m_{3AVG}$ | $m_{4AVG}$ |
|---|---|---|---|---|
| 1 | 1.7210 | — | — | — |
| 2 | 1.8111 | 1.8791 | — | — |
| 3 | 1.8290 | 1.8882 | 1.8168 | — |
| 4 | 1.8621 | 1.8080 | 2.0492 | 1.7078 |

Once the thickness multiplier(s) $m_{KAVG}$ have been determined such that the multi-layer photonic structure is optimized for omni-directional properties, the thickness of each layer of the multi-layer photonic structure may be calculated utilizing $m_{KAVG}$. For example, for the UV-IR reflector example described herein where the multi-layer photonic structure comprises K groups of the form [0.5 $m_K$L $m_K$H 0.5 $m_K$L] such that the multi-layer has the form [(0.5 $m_K$L $m_K$H 0.5 $m_K$L)$^K$], the thickness $D_L$ of each layer of low index material L and the thickness $D_H$ of each layer of high index material H may be calculated using Equations (1) and (2). As described above, the UV-IR reflector may have layers of low index material and high index material having indices of refraction $n_L$ and $n_H$ of 1.5 and 2.5, respectively, and the reference wavelength $\lambda_{ref}$ is 550 nm. Values for the thickness of each layer in the multi-layer photonic structure are shown below in Table 4. The thickness multipliers $m_{KAVG}$ for K=4 were used to calculate the thickness of each layer.

TABLE 4

| K | $m_{KAVG}$ | $D_L$ (nm) | $D_H$ (nm) |
|---|---|---|---|
| 1 | 1.8621 | 85.2842 | 102.4155 |
| 2 | 1.8080 | 82.8064 | 99.44 |
| 3 | 2.0492 | 93.8534 | 112.706 |
| 4 | 1.7078 | 78.2172 | 93.929 |

Once the thickness of each layer in the multi-layer photonic structure has been determined, the multi-layer photonic structure may be deposited on a substrate such that each layer of the multilayer photonic structure has the proper thickness to achieve the desired omni-directional properties in the multi-layer photonic structure. Various material deposition and/or materials processing techniques may be used to deposit the multi-layer structure on the substrate including, without limitation, physical vapor deposition, chemical vapor deposition, sol gel processes, electron beam evaporation of alternating layers, vacuum evaporation of alternating layers, thermal evaporation, electrochemical deposition and etching processes, high-vacuum vapor deposition and oxidation processes, sputtering of alternating layers, molecular-beam epitaxy processes, thermal mechanical processing, chemical processing, poly-electrolyte multi-layer deposition by 'layer by layer' processing and/or combinations thereof. The aforementioned techniques may be used to deposit the multi-layer photonic structures on substrates formed from various material including, without limitation, metals, alloys, polymers, ceramics, glass and combinations thereof.

By way of illustration, the UV-IR reflector described hereinabove may be implemented by depositing layers of high and low index materials to form the multi-layer photonic structure 100 depicted in FIG. 3. For example, as described hereinabove, the high index material 102 may comprise a material with an index of refraction $n_H$ of 2.5, such as anatase, while the low index material 104 may comprise a material with an index of refraction $n_L$ of 1.5, such as silica. The high and low index materials may be deposited on a glass substrate ($n_{substrate}$=1.52) in groups of 3 layers wherein each group has the form [0.5 $m_K$L $m_K$H 0.5 $m_K$L]. As noted herein, the multi-layer photonic structure comprises 4 groups of layers such that the overall structure may be written as [(0.5 $m_K$L $m_K$H 0.5 $m_K$L)$^4$]. The thickness of each layer L and H in each group $G_K$ are shown above in Table 4.

It should now be understood that the method described herein may be used to produce multi-layer photonic structures which are optimized for a desired characteristic property. Further, while specific examples described herein relate to optimizing a multi-layer photonic structure for the reflectance characteristic property, it should be understood that the method described herein may also be utilized to optimize the transmittance of a multi-layer photonic structure.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method for producing a multi-layer photonic structure comprising at least one group of alternating layers of high index material and low index material, the method comprising:
   determining a characteristic property function for the multi-layer photonic structure;
   determining a thickness multiplier for the at least one group of alternating layers by fitting the characteristic property function to a target profile;
   adjusting the characteristic property function with the determined thickness multiplier; and
   comparing an adjusted characteristic property function to the target profile, wherein, when the adjusted characteristic property function does not approximate the target profile, at least one additional group of layers is added to the multi-layer photonic structure.

2. The method of claim 1 further comprising:
   calculating a thickness of the layers of high index material and low index material in the at least one group of alternating layers based on the determined thickness multiplier for the at least one group of alternating layers when the adjusted characteristic property function approximates the target profile; and
   forming the multi-layer photonic structure on a substrate by depositing the at least one group of alternating layers of high index material and low index material on the substrate such that each layer of the multi-layer structure comprises the calculated thickness.

3. The method of claim 1 wherein the characteristic property function represents the reflectance of the multi-layer photonic structure, the transmittance of the multi-layer photonic structure or the absorptance of multi-layer photonic structure.

4. The method of claim 1 wherein the characteristic property function is determined using a transfer matrix method.

5. The method of claim 4 further comprising selecting an index of refraction $n_L$ for the low index material, an index of refraction $n_H$ for the high index material, a reference wavelength $\lambda_{ref}$, an index of refraction $n_0$ for an incidence medium, an index of refraction $n_{substrate}$ for a substrate medium, an angle of incidence $\theta_0$ of incident light and a polarization of incident light.

6. The method of claim 1 wherein:
the at least one group of alternating layers comprises multiple groups of alternating layers; and
a thickness multiplier is determined for each group of alternating layers.

7. A method for producing an omni-directionally reflective multi-layer photonic structure comprising at least one group of alternating layers of high index material and low index material, the method comprising:
determining reflectance functions for the multi-layer photonic structure for multiple angles of light incident on the multi-layer photonic structure;
determining a value for a thickness multiplier for each group of alternating layers by fitting the reflectance function for each angle of light to a target reflectance profile;
adjusting the reflectance function for each angle of light based on the determined thickness multipliers; and
comparing the adjusted reflectance function for each angle of light to the target reflectance profile, wherein, when the adjusted reflectance functions do not approximate the target reflectance profile, at least one additional group of layers is added to the multi-layer photonic structure.

8. The method of claim 7 further comprising determining an average thickness multiplier for each group of layers based on the thickness multiplier of each group of layers for each angle of light when the adjusted reflectance profiles for each angle of light approximate the target reflectance profile.

9. The method of claim 7 further comprising:
calculating a thickness of the layers of high index material and low index material in each group of alternating layers based on the determined value of the average thickness multiplier for each group of alternating layers; and
forming the multi-layer photonic structure on a substrate by depositing the at least one group of alternating layers of high index material and low index material on the substrate such that each layer of the multi-layer structure comprises the calculated thickness.

10. The method of claim 7 wherein the reflectance is determined by a transfer matrix method.

11. The method of claim 7 further comprising selecting an index of refraction $n_L$ for the low index material, an index of refraction $n_H$ for the high index material, a reference wavelength $\lambda_{ref}$, an index of refraction $n_0$ for an incidence medium, an index of refraction $n_{substrate}$ for a substrate medium, an angle of incidence $\theta_0$ of incident light and a polarization of incident light.

12. The method of claim 7 wherein the reflectance function is fit to the target reflectance profile with a non-linear curve fitting algorithm.

13. A method for producing an omni-directional UV-IR reflector comprising at least one group of alternating layers of high and low index material, the method comprising:
determining reflectance functions for multiple angles of light incident on the multi-layer photonic structure;
selecting a target reflectance profile having about 100% reflectance for wavelengths of light in the UV range of the electromagnetic spectrum, less than 100% reflectance for wavelengths of light in the visible range of the electromagnetic spectrum, and about 100% reflectance for wavelengths of light in the IR range of the electromagnetic spectrum;
determining a value for the at least one thickness multiplier by fitting the reflectance function for each angle of light to a target reflectance profile; and
adjusting the reflectance function for each angle of light based on the determined thickness multipliers; and
comparing the adjusted reflectance function for each angle of light to the target reflectance profile, wherein, when the adjusted reflectance functions do not approximate the target reflectance profile, at least one additional group of layers is added to the multi-layer photonic structure.

14. The method of claim 13 further comprising determining an average thickness multiplier for each group of layers based on the thickness multiplier of each group of layers for each angle of light when the adjusted reflectance profiles for each angle of light approximate target profile.

15. The method of claim 13 further comprising:
calculating a thickness of the layers of high index material and low index material in the at least one group of alternating layers based on the determined average thickness multiplier for each group of alternating layers; and
forming the multi-layer photonic structure on a substrate by depositing each group of alternating layers of high index material and low index material on the substrate such that each layer of the multi-layer structure comprises the calculated thickness.

16. The method of claim 13 wherein the target reflectance profile is a square-well function comprising a reflectance of 100% for wavelengths from about 200 nm to about 350 nm, a reflectance of about 10% for wavelengths from about 350 nm to about 850 nm, and a reflectance of 100% for wavelengths from about 850 nm to about 2100 nm.

17. The method of claim 13 wherein the reflectance is determined by a transfer matrix method.

18. The method of claim 17 further comprising selecting an index of refraction $n_L$ for the low index material, an index of refraction $n_H$ for the high index material, a reference wavelength $\lambda_{ref}$, an index of refraction $n_0$ for an incidence medium, an index of refraction $n_{substrate}$ for a substrate medium, and a polarization of incident light.

19. The method of claim 18 wherein the at least one group of alternating layers has a form [0.5 mL mH 0.5 mL] wherein m is the thickness multiplier, L is a layer of low index material and H is a layer of high index material.

20. The method of claim 19 wherein a thickness $D_L$ of each layer of low index material is:

$$D_L = \frac{m\lambda_{ref}}{8n_L}; \text{ and}$$

a thickness $D_H$ of each high index material is:

$$D_H = \frac{m\lambda_{ref}}{4n_H}.$$

* * * * *